(12) United States Patent
Sasaki

(10) Patent No.: US 7,529,027 B2
(45) Date of Patent: May 5, 2009

(54) ROD LENS ARRAY AND METHOD OF MANUFACTURING THE SAME

(75) Inventor: Kiyotaka Sasaki, Tokyo (JP)

(73) Assignee: Nippon Sheet Glass Company, Ltd., Tokyo (JP)

( * ) Notice: Subject to any disclaimer, the term of this patent is extended or adjusted under 35 U.S.C. 154(b) by 335 days.

(21) Appl. No.: 11/412,872

(22) Filed: Apr. 28, 2006

(65) Prior Publication Data

US 2006/0245064 A1 Nov. 2, 2006

(30) Foreign Application Priority Data

May 2, 2005 (JP) ............................ P2005-134343
May 2, 2005 (JP) ............................ P2005-134417

(51) Int. Cl.
*G02B 27/10* (2006.01)
(52) U.S. Cl. ...................................... 359/619; 359/622
(58) Field of Classification Search ................... 359/619
See application file for complete search history.

(56) References Cited

U.S. PATENT DOCUMENTS 4,852,982 A * 8/1989 Yamamoto et al. .......... 359/652

2001/0033434 A1 * 10/2001 Fukuzawa .................... 359/811
2005/0161583 A1 * 7/2005 Matsumoto ............... 250/208.1

FOREIGN PATENT DOCUMENTS

| CN | 85102289 | 8/1986 |
|---|---|---|
| CN | 1519585 | 8/2004 |
| JP | 61-55610 | 3/1986 |
| JP | 2001-318208 | 11/2001 |

OTHER PUBLICATIONS

Office Action issued by the Chinese Patent Office on May 9, 2008, in relation to the corresponding Chinese application with English language translation, pp. 1 to 15.

* cited by examiner

*Primary Examiner*—Ricky L Mack
*Assistant Examiner*—James C Jones
(74) *Attorney, Agent, or Firm*—Whitham Curtis Christofferson & Cook, PC

(57) ABSTRACT

In a rod lens array having a structure in which a plurality of rod lens elements are arranged between two side panels and a resin is filled and cured in spaces between the rod lens elements to be integrally formed, the side panels are made of a glass fiber reinforced epoxy resin and a phenol-based curing agent is used as a curing agent of the epoxy resin. In detail, the curing agent is exemplified by a phenol-based curing agent including a tris-hydroxyphenyl-methane skeleton.

12 Claims, 3 Drawing Sheets

(EXAMPLE 1-1)

(COMPARATIVE EXAMPLE 1-1)

ROD LENS ARRAY AND METHOD OF MANUFACTURING THE SAME

BACKGROUND OF THE INVENTION

1. Field of the Invention

The present invention relates to a rod lens array in which a plurality of rod lens elements are arranged between two side panels and a resin is filled and cured in spaces between the rod lens elements to be integrally formed and a method of manufacturing the same. Particularly, the present invention relates to a rod lens array which improves an arrangement, optical performance, and the weatherability of lens elements, by using a glass fiber reinforced epoxy resin which is used as the side panels and a phenol-based curing agent which is used as a curing agent of the epoxy resin as well as by using an additional reaction type silicone resin which contains a spherical organic filler monodispersed and whose viscosity is adjusted, as the resin for filling the spaces.

2. Related Art

As well known in the art, a rod lens array has a structure in that a plurality of minute gradient index rod lens elements are arranged between two side panels and a resin is filled between spaces of the lens elements to be integrally formed to each other, and is an example of optical components for forming a single continuous erected unit magnification image. Since such a rod lens array has a short optical path length and needs no inverting mirror, it is possible to make the device be smaller. Because of the size-reducing feature, the rod lens array is commonly used as an optical component not only for an image reading system such as a facsimile, an image scanner, a copier, etc which forms images, but also for an image writing system that forms a latent image on a photoreceptor in accordance with supplied image signals. Recently, high resolution has been accelerated, and the requirements for higher precision in latent image and for better quality in terms of the precision of the position in which an image is formed increase.

Conventionally, this type of rod lens array is manufactured by a method as disclosed in JP 61-55610A. For example, a spacer which is used as a reference for arrangement is provided on a substrate, and a predetermined number of fiber lens elements are arranged so as to form one or more lines along a surface of the substrate by using the spacer as a reference. After arranging the lens elements in an array, a temporary spacer is disposed so as not to disturb the arrangement, and another substrate is used as a cover to press the lens elements. In this state, a resin is filled into the spaces of the lens elements to keep the shape and satisfy the optical performance. Thereafter, a lens block which is integrally formed by the cured resin is cut to a predetermined lens length, and both cut edges are ground.

Here, a glass fiber reinforced plastic (FRP) is used as the side panel, and particularly, a glass fiber reinforced epoxy resin panel is extensively used (refer to. JP-A-2001-318208) on the following grounds.

(a) It is necessary that a thermal expansion coefficient of the side panel is similar to that of a material of the lens so that undesirable arrangement of the lens elements is prevented during heat treatment after filling of the resin.

(b) It is necessary that grindability of the side panel is similar to that of the material of the lens because the side panel must be ground like the lens elements.

(c) Use of a panel glass may be considered because the material of the lens is glass, but the panel glass is difficult to handle because the panel glass is easily broken.

In this case, since the rod lens arrays are cut from a lens block by one after filling and curing of the resin, the side panel must be made of a material having excellent heat resistance. Accordingly, in related art, a curing agent used to produce a glass fiber reinforced epoxy resin panel is limited to acid anhydrides or heat-resistant amines so that the glass fiber reinforced epoxy resin panel is sustained in a process at bout 200° C. Furthermore, if the above-mentioned curing agents are used, the calcination treatment is conducted after curing of the resin so as to stabilize a quality of the glass fiber reinforced epoxy resin panel. For example, the calcination treatment is conducted at about 200° C. for several tens hours while a load is applied thereto.

However, the rod lens array in which the glass fiber reinforced epoxy resin panel is used as the side panel has a problem in that a waterdrop-shaped extraneous substance is formed on a surface of the lens elements after a weatherability test (dampproof test) and acts as a lens, thus significantly reducing optical properties.

Further, there is a problem in that a glass cloth of the glass fiber reinforced epoxy resin panel comes off the panel and thus increases unevenness of a surface thereof, causing the precision of arrangement of the lens elements to be deteriorated.

Additionally, there are problems in that a surface of the glass fiber reinforced epoxy resin panel is stained by an adhesive (cyanoacrylates) used during a production process when an amine-based curing agent is used as an oxidizing agent and that high temperature heating and cleaning are necessary for a long time in order to remove the adhesive, resulting in poor productivity.

Turning to the filler provided between the side panels, the resin which is filled in order to support the fiber lens elements to each other includes an epoxy resin or a silicone resin. As for the resin, a desired amount of inorganic filler is added thereto in order to improve the cutting performance while cutting. Further, the viscosity of the resin is comparatively high, for example, 2500 to 3000 mPa·s and the resin is filled by suction.

In recent years, in order to form an image with a high resolution and less irregularity, it is required to decrease the lens diameter (for example, 0.6 mm or less). However, if the resin used in the related art is used, there are problems in that in the case of a lens with a small diameter, the positions or directions of the lenses may be irregular (that is, arrangement performance is lowered). The above problems may arise due to the space becoming small according to the small lens diameter, difficulty in filling the resin into the space, limited time available, thickening during filling, and increased viscosity resistance. When using the epoxy resin, the lens arrangement is disturbed due to the shrinkage amount of the curing being increased, and thus the optical performance is lowered and the position where the image is formed is deviated.

There are further problems in that a resin is not completely filled in all of the portions to cause optical deterioration. These problems may be caused by the weak flowability of resin due to high thixotropy and high viscosity of the epoxy resin, aggregation of the inorganic filler or clogging of the resin.

Further, due to the high viscosity of resin, the spaces of the lens elements having small diameter become smaller, it takes a long time to fill the spaces, and the workability is lowered. Since the adhesive component of the resin is not suitable for the lens element (glass) and the substrate (FRP: glass fiber reinforced plastic), there are problems in that the adhesive force of the lens array is not strong such that the adhering failure frequently occurs.

SUMMARY OF THE INVENTION

An object of the present invention is to provide a rod lens array which has high productivity, excellent arrangement of lens elements, superior optical properties, and excellent weatherability.

Another object of the invention is to satisfactorily manufacture a rod lens array having excellent arrangement performance and optical performance and high strength.

According to a first aspect of the invention, a rod lens array has a structure in which a plurality of rod lens elements are arranged between two side panels and a resin is filled and cured in spaces between the rod lens elements to be integrally formed. Further, in the rod lens array, the side panels are made of a glass fiber reinforced epoxy resin and a phenol-based curing agent is used as a curing agent of the epoxy resin.

The curing agent may be exemplified by a phenol-based curing agent including a tris-hydroxyphenyl-methane skeleton. However, the curing agent available to the invention may not include the tris-hydroxyphenyl-methane skeleton as long as the curing agent is the phenol-based curing agent. The curing agent may be exemplified by an aralkyl modified phenol-based curing agent, such as a polyphenol-based curing agent, a bisphenol-based curing agent, a polyphenol-based curing agent, a novolac-type phenol-based curing agent, and a phenylene group/methylene group/phenol-type curing agent, an annular aliphatic group modified phenol-based curing agent, an alkylene modified phenol-based curing agent, a nitrogen-containing modified phenol curing agent such as a triazine modified phenol curing agent, a phosphorus-containing modified phenol curing agent, and a silicone-containing modified phenol curing agent.

Furthermore, the present invention is to provide an image forming apparatus that transmits an image by using the rod lens array to form the image.

A rod lens array of the present invention includes a glass fiber reinforced epoxy resin, which is produced by using a phenol-based curing agent as a curing agent, as a side panel, thus unevenness of a surface of the side panel is reduced and arrangement of lens elements is improved. Additionally, since an extraneous substance is not attached to a surface of a lens after a weatherability test, performance of the lens is prevented from being deteriorate. Furthermore, a difference in thickness of the lens arrays is reduced, thus a high quality image forming apparatus is produced.

According to second aspect of the invention, a rod lens array has a structure in which a plurality of rod lens elements are arranged between two side panels and a resin is filled and cured in spaces between the rod lens elements to be integrally formed. The resin that is filled in the spaces is an additional reaction type silicone resin which contains 0.1 to 20 mass % of a monodispersed spherical organic filler having an average particle diameter of 0.1 to 25 μm. In this aspect, a resin component as well as an oil component may be added to the silicone resin.

According to another aspect of the invention, a method of manufacturing a rod lens array includes: an assembling process of aligning a plurality of fiber lens element on a substrate and disposing another substrate thereon to fix; a filling curing process of filling and curing a resin into spaces of the assembled lens element arrangement; a cutting process of cutting a lens block which is integrally formed by the cured resin to a predetermined lens length; and a grinding process of grinding both cut edges. As the resin which is sucked and filled in the spaces of lens element arrangement in the filling and curing process, an additional reaction type silicone resin may be used. The additional reaction type silicone resin contains 0.1 to 20 mass % of a monodispersed spherical organic filler having an average particle diameter of 0.1 to 25 μm and the viscosity thereof is 500 to 1500 mPa·s. Further, 0.01 to 0.5 mass % of a curing retardant may be added to the silicone resin to control the change of viscosity while filling.

Further, according to still another aspect of the invention, an image forming apparatus that transmits and forms an image by using the rod lens array according to above-mentioned aspect is provided.

In the rod lens array according to the invention, since the additional reaction type silicone resin containing the monodispersed spherical organic filler is used, it is possible to generate no aggregation, improve the clogging of the resin, and reduce the non-filling failure. Further, according to the method of manufacturing a rod lens array of the invention, since the additional reaction type liquid silicone resin having the viscosity of 500 to 1500 mPa·s is used and a monodispersed spherical organic filler is contained thereto, it is possible to remove the arrangement disturbance due to the curing shrinkage, and the failure of no-filling. Therefore, even though a lens element having a small diameter is used for the rod lens array, the arrangement performance and the optical performance can be improved.

DETAILED DESCRIPTION OF THE PREFERRED EMBODIMENTS

Figure 1:
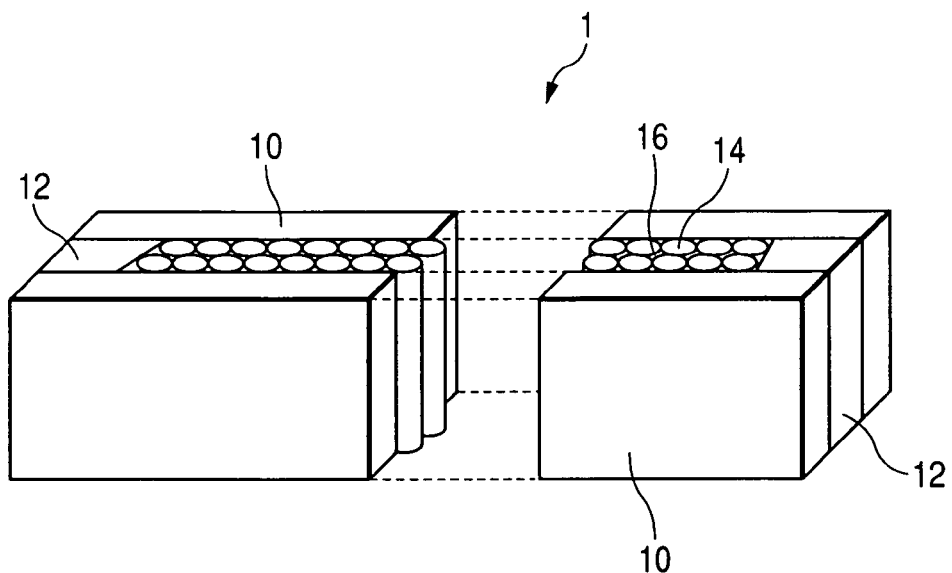
FIG. 1 is a perspective view of a rod lens array according to the present invention.

FIG. 1 is a perspective view of a typical rod lens array 1 according to the present invention. Two side panels 10 are assembled so as to face each other with a space by interposing both spacers 12 therebetween. A plurality of rod lens elements 14 are arranged in two lines between the side panels 10. A resin 16 is filled into the space of lens elements and cured to be integrally assembled. The outer feature of the rod lens array 1 may be the same as the conventional one. In this invention, the side panels are composed of a glass fiber reinforced epoxy resin and a phenol-based curing agent is used as a curing agent of the epoxy resin.

The reason why performance of the lens is significantly reduced when an acid anhydride-based curing agent (for example, phthalic anhydride) is used as the curing agent of the epoxy resin is as follows. The unreacted residual curing agent extracted by moisture in the air is reacted with an alkali component of the glass lens, which is extracted by moisture in the air, to form a compound and thus generate a waterdrop-shaped extraneous substance on a surface of the lens. In this regards, if the phenol-based curing agent is used as the curing agent of the glass fiber reinforced epoxy resin as disclosed in the present invention, the curing agent does not form a compound along with the alkali component of glass on the surface of the lens due to a difference in polarity. Accordingly, the performance of the lens does not be deteriorated during a weatherability test for a long time.

Furthermore, reduction in productivity resulting from attachment of an adhesive to the glass fiber reinforced epoxy resin panel and a stain thereof (a chemical reaction of amine and cyanoacrylate), which are produced by an amine-based curing agent as the curing agent of the epoxy resin, may be avoided by using the phenol-based curing agent because the above-mentioned reaction does not occur due to a difference in polarity.

Additionally, in case the phenol-based curing agent is used, it is unnecessary to conduct calcination treatment after the curing reaction because stability is excellent. If the calcination treatment is conducted, transpiration and transmutation of the resin occur, and, in extreme cases with respect to this, brittleness occurs, thereby peeling. Thus, a volume of the resin is reduced and the glass cloth comes off the surface, resulting in conspicuous unevenness of the surface and increased thickness variation. In this regards, in the present invention, since it is unnecessary to conduct calcinations treatment, unevenness of the surface is insignificant and not variable, thus precision of arrangement of the lens elements is improved.

In this invention, the resin which is filled into the spaces is an additional reaction type silicone resin containing 0.1 to 20 mass % of a monodispersed spherical organic filler having an average particle diameter of 0.1 to 25 μm.

The silicone resin is divided into a condensation reaction type and an additional reaction type according to the reaction when curing (polymerizing). The additional reaction type which is used in this invention is a type of polymerizing by opening a double bond of molecules and adding another molecule thereto. Therefore, since the shrinkage during polymerizing is small, the arrangement deviation can be reduced, the deformation of rod lens array 1 becomes smaller, and deviation in a position where an image is formed can be reduced. More specifically, the curing shrinkage ratio may be 250 ppm or less.

Since the lens array 1 is prepared by cutting a lens block, the cutting performance is improved by adding a filler into a resin. If the amount of added filler is too small, it is difficult to improve the cutting performance. Otherwise, if the amount of added filler is too large, the resin becomes flimsy and the adhering performance of a substrate (FRP board) and a lens is lowered. As mentioned above, 0.1 to 20 mass % of the filler is added thereto. An inorganic filler barely aggregates and clogging of resin barely occurs, it is further possible to prevent the clogging and non-filling failure by using an organic filler. Particularly, by monodispersing, the clogging is remarkably prevented. An example of monodispersing process is a silylation process. It is possible to suppress aggregation of particles by contacting a silylation agent such as a triorganosilyl group containing organic silicon compound or an organoalkosysilane with a surface of an organic particle.

It is preferable that a resin component as well as an oily component is added to a silicone resin. By adding the resin component, it is possible to improve the hardness and the strength of the resin, and thus the strength of the lens array 1 becomes stronger. The resin component is a trifunctional or tetrafunctional siloxane compound, and 0.1 to 20 mass % (preferably, 0.5 to 10 mass %) thereof is added.

Figure 2A:
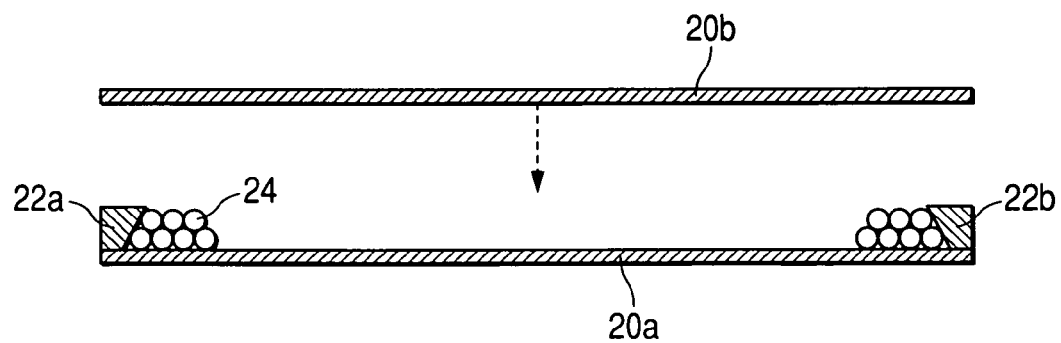
FIGS. 2A and 2B are explanatory views showing an example of a manufacturing process.
Figure 2B:
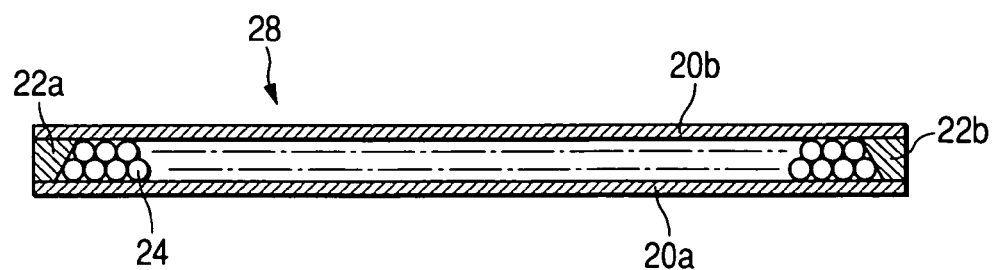

The rod lens array 1 is prepared by the following procedure. An example of the manufacturing process is shown in FIGS. 2A and 2B. A spacer 22a is mounted on a side edge of one of the substrates (glass fiber reinforced resin plate) 20a. Next, the substrate 20a is inclined so that the spacer 22a is positioned at the bottom, fiber lens elements 24 are compactly arranged on the substrate 20a. For example, the lens elements are arranged in two stages. After arranging a predetermined number of lens elements 24, another spacer 22b is mounted on the other edge of the substrate 20a (refer to FIG. 2A). Another substrate 20b overlaps thereon to assemble a lens element arrangement 28 (refer to FIG. 2B). A resin is filled in a space of the assembled lens element arrangement 28 so to be cured. The filling of the resin is performed such that a liquid resin is supplied to an end of the space, and a vacuum suction is performed from the other end to entirely and uniformly fill the resin in the space of the lens element arrangement. Thereafter, the filled resin is cured, and a lens block which is combined by the cured resin is cut to a predetermined lens length. Finally, the cut edges (rod lens edge) are ground.

In the present invention, as the resin which is sucked and filled in the space of the lens element arrangement, an additional reaction type silicone resin is used. The additional reaction type silicone resin contains 0.1 to 20 mass % of a monodispersed spherical organic filler having an average particle diameter of 0.1 to 25 μm and the viscosity of 500 to 1500 mPa·s. 0.01 to 0.5 mass % of a curing retardant is added to the silicone resin to control the change of viscosity while filling. An example of the curing retardant is a mixture of polyalkylalkenylsiloxane and a reaction regulator.

The rod lens array 1 can form a single continuous erected unit magnification image. Therefore, an optical printer (image forming apparatus) is configured by using an LED printer head which is formed by combining with an LED array, and thus it is further possible to provide an image with high resolution and high quality.

Figure 3A:
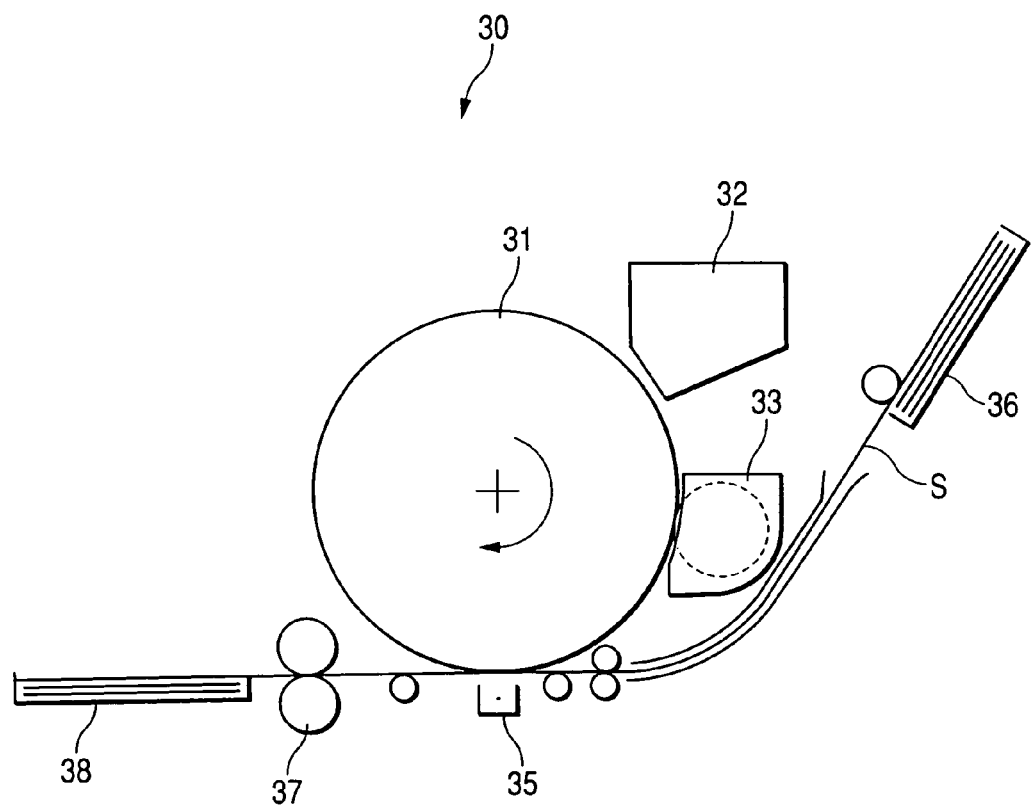
FIGS. 3A and 3B show an example where the rod lens array is applied in an optical printer as an image forming apparatus.
Figure 3B:
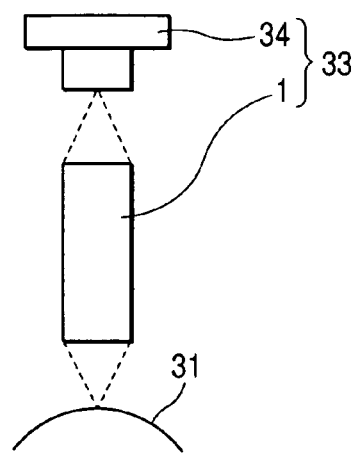

FIGS. 3A and 3B show an example where the rod lens array 1 is applied in an optical printer 30 as an image forming apparatus.

Main part of the optical printer 30 is configured by a cylindrical photosensitive drum 31 and other devices such as an optical printer head 32 and a developing device 33 which are opposed to a circumferential surface of the photosensitive drum 31.

The optical printer head 32 is provided with a combination of a light emitting device array 34 and the rod lens array 1 as shown in FIG. 3B. The light emitting device array 34 emits light by driving LEDs in the array according to an image signal, the light emitted from the light emitting device array is condensed by the rod lens array 1 to expose the circumferential surface of the photosensitive drum 31. Area of the photosensitive drum 31 at which the light is exposed is charged to form a latent image. Then, toner is imparted to the latent image formed on the photosensitive drum 31 by the developing device 33, so that the image is developed. The developed image on the photosensitive drum 31 is then transferred in a transferring device 35 to a sheet S that is transported from a sheet cassette 36. Subsequently, the image on the sheet S is fixed in a fixing device 37 to complete image formation, and the sheet S is stacked in a stacker 38.

Figure 4:
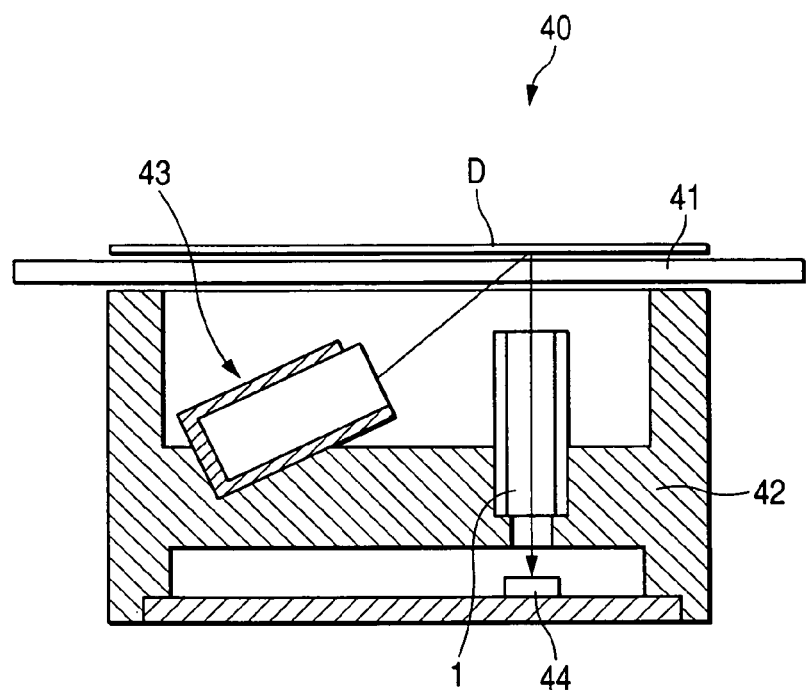
FIG. 4 shows an example where the rod lens array is applied in an image scanning device provided in a scanner and a facsimile etc.

FIG. 4 shows an example where the rod lens array 1 is applied in an image scanning device 40 provided in a scanner and a facsimile etc.

The image scanning device 40 includes a document table glass 41 on which a document D to be scanned is placed and a scanning device body 42 below the document table glass 41 in which a linear light source 43, the rod lens array 1 and a linear image sensor 44 in which photoelectric conversion elements are linearly arrayed are mounted. The linear light source 43, the rod lens array 1 and the linear image sensor 44 are disposed so as to extend perpendicularly with respect to the section shown in FIG. 4.

The linear light source 43 irradiates the document D placed on the document table glass 41 and the light reflected on the document D is condensed by the rod lens array 1 on the linear image sensor 44, so that electric signal according to light intensity of the light reflected from the document D is obtained.

EXAMPLE 1

Rod lens arrays (Example 1-1 and Comparative Examples 1-1 and 1-2) were produced by using the following three glass fiber reinforced epoxy resins as the side panels. Fiber-shaped lens materials having a diameter of 0.453 mm were stacked between the two glass fiber reinforced epoxy resin panels in two stages to assemble a lens material arrangement body, and a silicone resin was absorbed to be filled between the lens materials. Next, heating and curing were conducted at 135° C. for 3 hours to produce a lens block. The lens block was cut in a predetermined size and then a section thereof is ground to form the rod lens array.

EXAMPLE 1-1

After carbon black was added to an epoxy resin by using a phenol-based curing agent including a tris-hydroxyphenyl-methane skeleton to conduct blackening, a glass cloth was dipped therein to produce a prepreg. The prepreg was heated to 200° C. and pressed to produce a glass fiber reinforced epoxy resin panel having a thickness of about 0.95 mm, and the panel was cut in a predetermined size (349×380 mm). Unevenness of a surface of the glass fiber reinforced epoxy resin panel obtained in example 1-1 was improved, so that the surface roughness of the central line Ra was 0.3 μm and the maximum height Ry was 1.1 μm.

Figure 5A:
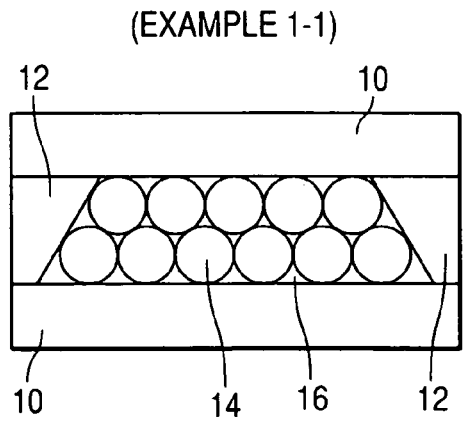
FIGS. 5A and 5B illustrate sections of rod lens arrays of example 1-1 and comparative example 1-1 after a weatherability test.

The rod lens arrays produced by using the glass fiber reinforced epoxy resin panel were randomly taken out, and the thickness variation was about 20 μm as a result of measuring the thickness precision. Furthermore, the maximum arrangement deviation was 15 μm as a result of measuring the arrangement precision of the rod lens arrays. The rod lens arrays were left under an atmosphere of 60° C., 90% Rh (relative humidity) or 1000 hours and taken out, and external appearance and optical properties were evaluated. As shown in FIG. 5A, extraneous substances were not observed on a surface of the lens (reference numerals correspond to those of FIG. 1). Variation in MTF (Modulation Transfer Function) measured as an optical performance was 1% or less. Furthermore, the rod lens array and the LED array were combined to form an LED print head, and an optical printer (image forming apparatus) was produced by using the LED print head to conduct image printing, thereby forming a fair image having no linear stain.

COMPARATIVE EXAMPLE 1-1

As in example 1-1, after carbon black was added to an epoxy resin by using a maleic anhydride-based curing agent as an acid anhydride-based curing agent to conduct blackening, a glass cloth was dipped therein to produce a prepreg. The prepreg was heated to 200° C. and pressed to produce a glass fiber reinforced epoxy resin panel having a thickness of about 0.95 mm. Furthermore, calcination treatment was conducted at 200° C. for 16 hours while a load was continuously applied. Next, the panel was cut in a predetermined size (349×380 mm). With respect to unevenness of a surface of the glass fiber reinforced epoxy resin panel obtained in comparative example 1, the surface roughness Ra of the central line was 4.7 μm and the maximum height Ry was 8.9 μm.

Figure 5B:
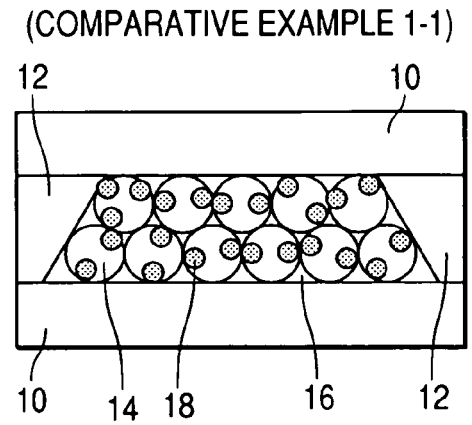

The rod lens arrays produced by using the glass fiber reinforced epoxy resin panel were randomly taken out, and the thickness variation was about 80 μm as a result of measuring the thickness precision. Furthermore, the maximum arrangement deviation was 31 μm as a result of measuring the arrangement precision of the rod lens arrays. The rod lens arrays were left under an atmosphere of 60° C., 90% Rh for 1000 hours and taken out, and external appearance and optical properties were evaluated. As shown in FIG. 5B, water-drop-shaped extraneous substances were observed on a surface of the lens (reference numerals correspond to those of FIG. 1, and the extraneous substance was designated by reference numeral 18). MTF measured as an optical performance was significantly reduced in comparison with MTF measured before a weatherability test, and the variation rate was 9.3%. Additionally, image printing was conducted by an optical printer (image forming apparatus) using the rod lens arrays, and the print line was observed.

COMPARATIVE EXAMPLE 1-2

As in example 1-1, after carbon black was added to an epoxy resin using a modified alicyclic amine curing agent as an amine-based curing agent to conduct blackening, a glass cloth was dipped therein to produce a prepreg. The prepreg was heated to 200° C. and pressed to produce a glass fiber reinforced epoxy resin panel having a thickness of about 0.95 mm. Furthermore, calcination treatment was conducted at 200° C. for 16 hours while a load was continuously applied. Next, the panel was cut in a predetermined size (349×380 mm). With respect to unevenness of a surface of the glass fiber reinforced epoxy resin panel obtained in comparative example 2, the surface roughness Ra of the central line was 3.8 μm and the maximum height Ry was 7.2 μm.

The rod lens arrays were produced by using the glass fiber reinforced epoxy resin panel. Since the glass fiber reinforced epoxy resin panel was stained by an adhesive used during a process, high temperature heating and cleaning were conducted for a long time (at 200° C. for 8 hours) to remove the adhesive. The rod lens arrays were randomly taken out, and the thickness variation was about 62 μm as a result of measuring the thickness precision. Furthermore, the maximum arrangement deviation was 28 μm as a result of measuring the arrangement precision of the rod lens arrays. The rod lens arrays were left under an atmosphere of at 60° C., 90% Rh for 1000 hours and taken out, and external appearance and optical properties were evaluated. Waterdrop-shaped extraneous substances were observed on a surface of the lens. MTF measured as an optical performance was significantly reduced in comparison with MTF measured before a weatherability test, and the variation rate was 6.7%. Additionally, image printing was conducted by an optical printer (image forming apparatus) using the rod lens arrays, and the print line was observed.

The results are shown in Table 1.

TABLE 1

| | (1) | | |
| --- | --- | --- | --- |
| | Ex. 1-1 | Comp. Ex. 1-1 | Comp. Ex. 1-2 |
| Type of curing agent | Phenol-based curing agent | Acid anhydride-based curing agent | Amine-based curing agent |

TABLE 1-continued

| | (1) | | |
|---|---|---|---|
| | Ex. 1-1 | Comp. Ex. 1-1 | Comp. Ex. 1-2 |
| Surface roughness Ra(μm) | 0.3 | 4.7 | 3.8 |
| Maximum height Ry(μm) | 1.1 | 8.9 | 7.2 |
| Thickness variation(μm) | About 20 | About 80 | About 62 |
| deviation of lens arrangement (μm) | 15 | 31 | 28 |
| MTF variation(%) | ≦1 | 9.3 | 6.7 |
| Extraneous substance | None | Occurrence of waterdrop-shaped extraneous substance | Occurrence of waterdrop-shaped extraneous substance |
| Printing quality | No linear stain | Nonuniform printing | Nonuniform printing |

The rod lens arrays using several resins as shown in Table 2 (Examples 2-1 and 2-2, and Comparative Examples 2-1 and 2-2) were prepared and tested. The lens materials in the fiber shape having a diameter of 0.453 mm were laminated in two stages between two glass fiber reinforced resin plates (FRP) to assemble a lens material arrangement (width: 349 mm, length: 400 mm), and the resin was interposed between the lens materials. The resin which could be filled was then cured at 135° C. for 3 hours to prepare a resin block. The resin block was cut to a predetermined size, and its edge was ground to obtain a rod lens array.

TABLE 2

| | (2) | | | |
|---|---|---|---|---|
| | Ex. 2-1 | Ex. 2-2 | Comp. Ex. 2-1 | Comp. Ex. 2-2 |
| Resin | Silicone resin A | Silicone resin B | Epoxy resin E | Silicone resin C |
| Viscosity (23° C.), (mPa·s) Immediately after mixing of resin | 1200 | 1000 | 1600 | 2200 |
| Four hours after mixing | 1400 | 1100 | 4000 | 3100 |
| Thixotropic index | 1.04 | 1.03 | 1.61 | 1.03 |
| Curing shrinkage (ppm) | 250 | 250 | 3500 | 310 |
| Hardness (JIS) | 52 | 49 | 95 | 42 |
| Filling time (min.) | 150 | 120 | 170 | >2000 |

EXAMPLE 2-1

The silicone resin A used in Example 2-1 was an additional reaction type silicone resin having a viscosity of 1200 to 1400 mPa·s, to which 15 mass % of vinyl trimethoxysilane was added as a resin component. Furthermore, 10 mass % of a monodispersed spheric polymethylsyl sesquioxane having an average particle diameter of 25 μm, 4.0 mass % of carbon black as a light shielding agent, and 0.1 mass % of a curing retardant were added.

EXAMPLE 2-2

The silicone resin B used in Example 2-2 was an additional reaction type silicone resin having a viscosity of 1000 to 1100 mpa·s, to which 15 mass % of vinyl trimethoxysilane was added as a resin component. Furthermore, 10 mass % of a monodispersed spheric polymethylsyl sesquioxane having an average particle diameter of 25 μm, 4.0 mass % of carbon black as a light shielding agent, and 0.1 mass % of a curing retarding agent were added.

COMPARATIVE EXAMPLE 2-1

The silicone resin E used in Comparative Example 2-1 was an epoxy resin having a viscosity of 1600 to 4000 mPa·s. Furthermore, 10 mass % of a monodispersed spheric polymethylsyl sesquioxane having an average particle diameter of 25 am, and 4.0 mass % of carbon black as a light shielding agent.

COMPARATIVE EXAMPLE 2-2

The silicone resin C used in Comparative Example 2-2 was a liquefied silicone resin having a viscosity of 2200 to 3100 mPa·s, to which 15 mass % of vinyl trimethoxysilane was added as a resin component. Furthermore, 10 mass % of a monodispersed spheric polymethylsyl sesquioxane having an average particle diameter of 25 μm, 4.0 mass % of carbon black as a light shielding agent, and 0.1 mass % of a curing retarding agent were added.

According to Comparative Example 2-1 as well as Examples 2-1 and 2-2, the lens array can be prepared. However, in Comparative Example 2-2, it is not possible to fill the space of the lens material arrangement with a resin, and thus it is difficult to prepare a lens array.

The results of evaluating the prepared rod lens array are shown in Table 3. Evaluation items are a ratio (%) of filling no resin between lens elements of rod lens array, a distance (μm) between optical axes of lens which represents arrangement performance, an image forming position deviation (μm) for 1200 dpi resolution which represents an optical performance. Evaluation of the non-filling ratio is performed such that the cut rod lens array is visually observed and a rod lens array having at least one through hole is counted. Evaluation of maximum optical axis distance is performed such that the distance of adjacent lens elements is measured at both edges, and the difference thereof is calculated. And then, the maximum value among the rod lens arrays is selected. Evaluation of maximum positional deviation is performed such that by using a first lens element as a reference, a position where n-th lens element is disposed in the position of lens diameter×n is a normal position. And then, the difference between n-th lens position when observing at a projection surface and the normal position is calculated to select the maximum value among the rod lens arrays.

TABLE 3

| | (2) | | | |
|---|---|---|---|---|
| | Ex. 2-1 | Ex. 2-2 | Comp. EX. 2-1 | Comp. EX. 2-2 |
| Ratio of non-filling | 0 | 0.1 | 37 | — |
| Maximum optical axis distance | 15 | 15 | 46 | — |

TABLE 3-continued

|  | (2) | | | |
| --- | --- | --- | --- | --- |
|  | Ex. 2-1 | Ex. 2-2 | Comp. EX. 2-1 | Comp. EX. 2-2 |
| Maximum image forming position deviation | 35 | 38 | 120 | — |

In Examples 2-1 and 2-2, the resin filling time is short, and thus preferred results are obtained. When comparing both Examples, Example 1 has an effect better that Example 2-2, for example, longer filling time, higher hardness, and smaller maximum image forming position deviation. Further, when the diameter of lens element is 0.564 mm, 0.900 mm, and 1.100 mm, the same result was obtained. In contrast, in Comparative Example 2-1, the hardness is high, the filling time is long, and the curing shrinkage is large. Therefore, Comparative Example 2-1 has worse evaluation result than Examples 2-1 and 2-2.

What is claimed is:

1. A rod lens array comprising:
   a plurality of rod lens elements;
   a pair of side panels between which said rod lens elements are arranged; and
   a resin filled and cured in spaces between the rod lens elements to be integrated;
   wherein the side panels are made of a cured glass fiber reinforced epoxy resin cured with a phenol-based curing agent;
   wherein the lens elements lack, on surfaces thereof, an extraneous substance including lacking a compound that is a reaction product of the curing agent and an alkali component of glass.

2. The rod lens array according to claim 1, wherein the cured glass fiber reinforced epoxy resin is cured with phenol-based curing agent including a tris-hydroxyphenyl-methane skeleton.

3. The rod lens array according to claim 1, wherein the glass fiber reinforced epoxy resin includes a glass cloth.

4. The rod lens array according to claim 1, wherein the resin that is filled in the spaces is a silicone resin which contains 0.1 to 20 mass % of a spherical filler having an average particle diameter of 0.1 to 25 μm.

5. An image forming apparatus that transmits and forms an image by using the rod lens array according to claim 1.

6. An image scanning device that scans an image by using the rod lens array according to claim 1.

7. A rod lens array comprising:
   a plurality of rod lens elements;
   a pair of side panels between which said rod lens elements are arranged; and
   a resin filled and cured in spaces between the rod lens elements to be integrated;
   wherein the resin that is filled in the spaces is an additional reaction type silicone resin which contains 0.1 to 20 mass % of a monodispersed spherical organic filler having an average particle diameter of 0.1 to 25 μm;
   wherein the lens elements, on surfaces thereof, lack a compound which is a reaction product of the curing agent and an alkali component of glass.

8. The rod lens array according to claim 7, wherein a resin component as well as an oil component is added to the silicone resin.

9. The rod lens array according to claim 7, wherein the side panels are made of a cured glass fiber reinforced epoxy resin cured with a phenol-based curing agent.

10. An image forming apparatus that transmits and forms an image by using the rod lens array according to claim 7.

11. An image scanning device that scans an image by using the rod lens array according to claim 7.

12. The rod lens array of claim 1, wherein the side panels have attached thereto no reaction product of amine and cyanoacrylate.

* * * * *